United States Patent
No et al.

(10) Patent No.: US 12,556,363 B2
(45) Date of Patent: Feb. 17, 2026

(54) METHOD AND DEVICE FOR MULTI-KEY HOMOMORPHIC ENCRYPTION

(71) Applicants: SEOUL NATIONAL UNIVERSITY R&DB FOUNDATION, Seoul (KR); INDUSTRY-ACADEMIC COOPERATION FOUNDATION, CHOSUN UNIVERSITY, Gwangju (KR)

(72) Inventors: Jong-Seon No, Seoul (KR); Young-Sik Kim, Gwangju (KR); Zahyun Koo, Anyang-si (KR); Joon-Woo Lee, Seoul (KR)

(73) Assignees: SEOUL NATIONAL UNIVERSITY R&DB FOUNDATION, Seoul (KR); INDUSTRY-ACADEMIC COOPERATION FOUNDATION, CHOSUN UNIVERSITY, Gwangju (KR)

( * ) Notice: Subject to any disclaimer, the term of this patent is extended or adjusted under 35 U.S.C. 154(b) by 217 days.

(21) Appl. No.: 18/169,950

(22) Filed: Feb. 16, 2023

(65) Prior Publication Data
US 2023/0269069 A1    Aug. 24, 2023

(30) Foreign Application Priority Data

Feb. 24, 2022 (KR) .......... 10-2022-0024657
Nov. 17, 2022 (KR) .......... 10-2022-0154691

(51) Int. Cl.
*H04L 9/00* (2022.01)
*H04L 9/08* (2006.01)
(Continued)

(52) U.S. Cl.
CPC ............ *H04L 9/008* (2013.01); *H04L 9/0861* (2013.01); *H04L 9/14* (2013.01); *H04L 9/304* (2013.01)

(58) Field of Classification Search
CPC .......... H04L 9/008; H04L 9/0861; H04L 9/14
See application file for complete search history.

(56) References Cited

U.S. PATENT DOCUMENTS

2009/0214023 A1 * 8/2009 Al-Somani ............ H04L 9/003
                                                            380/28
2015/0067336 A1 * 3/2015 Ding ..................... H04L 9/0819
                                                            713/171
(Continued)

FOREIGN PATENT DOCUMENTS

EP            4221069 A1 *  8/2023  ............. H04L 9/008
KR      10-1932032 B1      12/2018
(Continued)

OTHER PUBLICATIONS

Hao Chen et al., "Efficient Multi-Key Homomorphic Encryption with Packed Ciphertexts with Application to Oblivious Neural Network Inference", Session 2D: Encryption (Searchable, Updatable, Homomorphic, etc.), Nov. 11-15, 2019, CCS '19, pp. 395-412 (18 pages total).

(Continued)

*Primary Examiner* — Darshan I Dhruv
(74) *Attorney, Agent, or Firm* — Sughrue Mion, PLLC

(57) ABSTRACT

A device for performing multi-key homomorphic encryption includes a public key generator configured to generate a public key by using a secret key for each client, and a multiplication key generator configured to generate a multiplication key by reusing a public key protection error used in the generating of the public key. By reducing the size of (Continued)

the multiplication key by reusing the public key protection error, the operation time and memory may be reduced.

10 Claims, 3 Drawing Sheets

(51) Int. Cl.
*H04L 9/10* (2006.01)
*H04L 9/14* (2006.01)
*H04L 9/30* (2006.01)

(56) References Cited

U.S. PATENT DOCUMENTS

| | | | | |
|---|---|---|---|---|
| 2020/0082738 | A1* | 3/2020 | Poeppelmann | H04L 9/002 |
| 2022/0014351 | A1* | 1/2022 | Jung | H04L 9/0869 |
| 2022/0385461 | A1* | 12/2022 | Eom | H04L 9/0618 |
| 2023/0052293 | A1* | 2/2023 | Morchon | H04L 9/3093 |
| 2023/0171085 | A1* | 6/2023 | Lee | H04L 9/008 380/28 |
| 2024/0313944 | A1* | 9/2024 | Choi | H04L 9/008 |

FOREIGN PATENT DOCUMENTS

| | | |
|---|---|---|
| KR | 10-2116877 B1 | 6/2020 |
| KR | 10-2022-0005705 A | 1/2022 |

OTHER PUBLICATIONS

Shaveer Bajpeyi, "A Hardware Accelerator for Fully Homomorphic Encryption based Machine Learning Applications", Master of Applied Science, 2021, pp. i-xvi, 1-111 (127 pages total).

Office Action issued May 9, 2025 in Korean Patent Application No. 10-2022-0154691.

* cited by examiner

METHOD AND DEVICE FOR MULTI-KEY HOMOMORPHIC ENCRYPTION

CROSS-REFERENCE TO RELATED APPLICATIONS

This application is based on and claims priority under 35 U.S.C. § 119 to Korean Patent Application No. 10-2022-0024657, filed on Feb. 24, 2022, and Korean Patent Application No. 10-2022-0154691, filed on Nov. 17, 2022, in the Korean Intellectual Property Office, the disclosures of which are incorporated by reference herein in their entirety.

BACKGROUND

1. Field

One or more embodiments relate to multi-key homomorphic encryption. More particularly, one or more embodiments relate to a method of generating a multiplication key by reusing an error in multi-key homomorphic encryption.

2. Description of the Related Art

Recently, privacy-preserving machine learning methods have been developed, in which an operation result desired by a user may be received by performing an arithmetic operation in a state where user data is encrypted.

An example of privacy-preserving machine learning is multi-key homomorphic encryption. In multi-key homomorphic encryption, each user with data generates his or her own secret key, and thus it is difficult to access other user's data. In a system to which a multi-key homomorphic encryption method is applied, a server possesses a public key and a multiplication key of each user and performs ciphertext operation by using the keys. However, when the number of users increases, the number of public keys and multiplication keys that a server has to possess linearly increases according to the number of users, requiring a long time for ciphertext operation, and also consuming a large amount of arithmetic resources such as memory.

SUMMARY

One or more embodiments include a method for reduction of arithmetic operation of a multiplication key in multi-key homomorphic encryption by using an error value of a public key generated based on Ring Learning with Error (RLWE), in generating a multiplication key in a RERLWE environment. The RERLWE environment refers to a modified RLWE environment.

Additional aspects will be set forth in part in the description which follows and, in part, will be apparent from the description, or may be learned by practice of the presented embodiments of the disclosure.

According to one or more embodiments, a device for performing multi-key homomorphic encryption includes a public key generator configured to generate a public key by using a secret key for each client, and a multiplication key generator configured to generate a multiplication key by reusing a public key protection error used in the generating of the public key.

The device for performing multi-key homomorphic encryption may generate the multiplication key by using a modified RLWE sample, and the modified RLWE sample is defined in the form of $(\alpha, -\alpha s+x, \alpha x+e)$, where a denotes an element selected from a uniform distribution on Rq, s denotes a secret key distribution, and x and e denote an error distribution.

In the device for performing multi-key homomorphic encryption, the public key may be defined in the form that $pk_i=(\alpha, b_i=-\alpha \cdot s_i+x_i)$, where a denotes an element selected from a uniform distribution on Rq, $s_i$ denotes a secret key, and $x_i$ denotes the public key protection error.

In the device for performing multi-key homomorphic encryption, the public key may be that $mk_i=\alpha \cdot x_i+e_i+P \cdot s_i$, where a denotes an element selected from a uniform distribution on Rq, $s_i$ denotes a secret key, and $x_i$ denotes the public key protection error, and $e_i$ denotes a multiplication key protection error.

In the device for performing multi-key homomorphic encryption, when prior communication between the clients is possible, a common multiplication key that $$\vec{mk} = \sum_{i=0}^{k-1} mk_i,$$

$mk_i=\alpha \cdot x_i+e_i+P \cdot s_i$ may be generated with respect to all multiplication keys.

According to one or more embodiments, a device for performing multi-key homomorphic encryption, includes a secret key generator configured to generate a secret key, a public key protection error selector configured to select a public key protection error from an error distribution, a public key generator configured to generate a public key by using the secret key and the public key protection error, a multiplication key protection error selector configured to select a multiplication key protection error from the error distribution, and a multiplication key generator configured to generate a multiplication key by using the secret key, the public key protection error, and the multiplication key protection error.

According to one or more embodiments, a method of performing multi-key homomorphic encryption includes generating, by a public key generator, a public key by using a secret key for each client, and generating, by a multiplication key generator, a multiplication key by reusing a public key protection error used in the generating of the public key.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
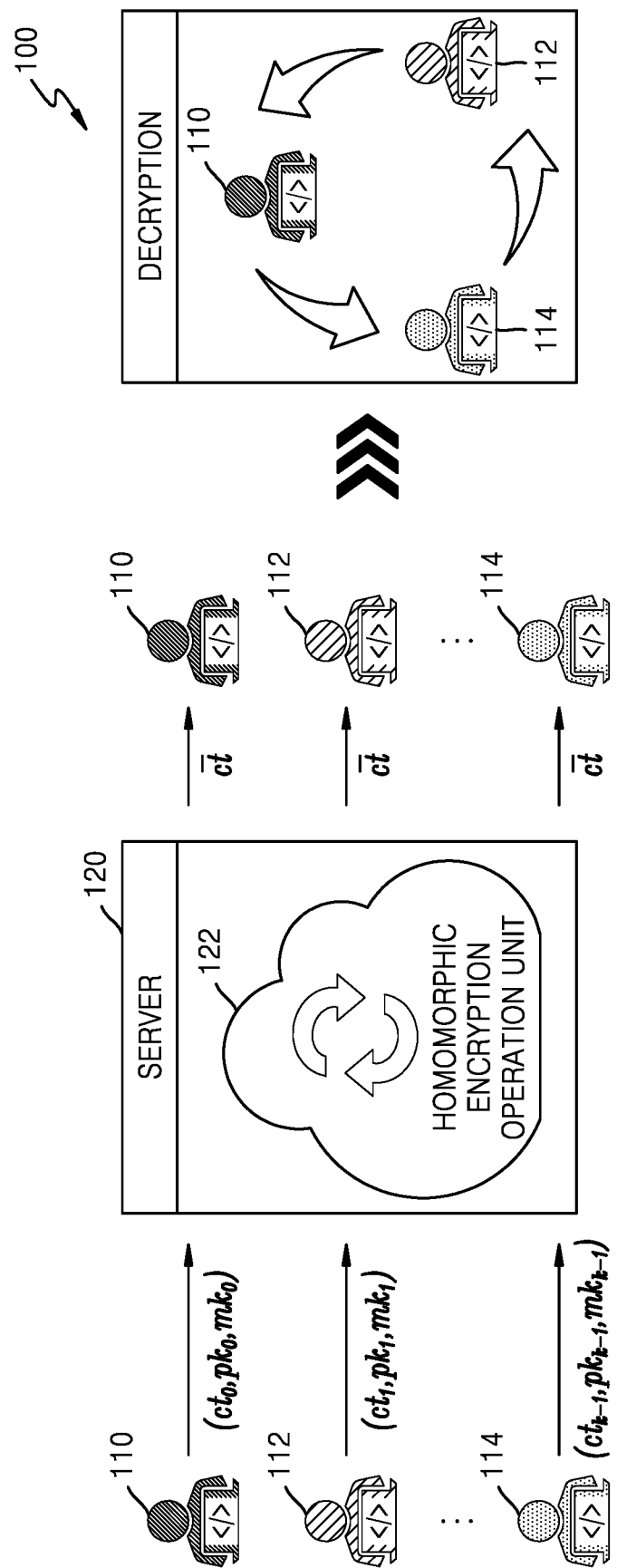
FIG. 1 illustrates an example of performing multi-key homomorphic encryption when prior communication between clients is impossible in a Ring Learning with Error (RLWE)-based multi-key homomorphic encryption system.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, the disclosure is described with reference to the drawings.

FIG. 1 illustrates an example of performing multi-key homomorphic encryption when prior communication between users is impossible in a Ring Learning with Error (RLWE)-based multi-key homomorphic encryption system 100.

The multi-key homomorphic encryption system 100 includes clients 110, 112, and 114 and a server 120. The clients 110, 112, and 114 and the server 120 each include a processor and a memory.

The server 120 may perform homomorphic encryption according to a Learning with Error (LWE)-based encryption method, and may perform an arithmetic operation through a homomorphic encryption operation unit 122, by using homomorphic encryption according to a Ring Learning with Error (RLWE)-based encryption method.

The server 120 requires a public key and a multiplication key of each client in order to perform a multiplication operation on two ciphertexts of the multi-key homomorphic encryption system 100.

A common public key $\hat{pk}$ and a common multiplication key $\hat{mk}$ are used when prior communication is possible between clients in a RLWE-based multi-key homomorphic encryption system.

$$\hat{pk} = \left(a, b = \sum_{i=0}^{k-1} b_i\right) = \left(a, -a \cdot \sum_{i=0}^{k-1} s_i + \sum_{i=0}^{k-1} x_i\right) = (a, -a \cdot s + x)$$

$$\hat{mk} = (\hat{mk}_0, \hat{mk}_1) = \left(\hat{mk}_0 = \sum_{i=0}^{k-1} mk_{i,0}, \hat{mk}_1 = \sum_{i=0}^{k-1} mk_{i,1}\right)$$

However, as in the example illustrated in FIG. 1, when prior communication between clients is impossible, the clients 110, 112, and 114 each transmit a public key $pk_i$, a multiplication key $mk_i$, and a cipher text $ct_i$ to the server 120, and the homomorphic encryption operation unit 122 of the server 120 performs a homomorphic encryption operation and transmits a generated cipher text $\overline{ct}$ to each of the clients 110, 112, and 114. Then, the clients 110, 112, and 114 perform decryption by cooperating with each other.

Here, when the number of clients increases, the number of the public keys $pk_i$ and the multiplication keys $mk_i$ of the clients 110, 112, and 114 that the server 120 has to possess increases, resulting in an increase in memory usage. In addition, when communication between the clients 110, 112, and 114 is impossible, all homomorphic operations is to be performed by the server 120, and the operation time for the multiplication operation becomes long.

Referring to FIG. 1, a method of performing RLWE-based multi-key homomorphic encryption when communication between clients is impossible is described.

In order to perform multi-key homomorphic encryption, each of the clients 110, 112, and 114 generates ciphertext moduli $q_0, q_1, \ldots q_L$ and special moduli $p_0, p_1, \ldots, p_K$. In this case, a format of a RLWE sample is defined as follows.

$$(\alpha, -\alpha s + x), \alpha \leftarrow R_Q, s \leftarrow \chi_{Key}, x \leftarrow \chi_{err}$$

, where a denotes an element that all clients need to be sharing, and is selected from a uniform distribution defined on $R_Q * R_P$, and s denotes a secret key distribution, and e denotes an error distribution. Here, $R_Q * R_P = R_{q0} \times \ldots \times R_{qL} \times R_{p0} \times \ldots \times R_{pK}$, and $$Q = \prod_{i=0}^{L} q_i, \text{ and } P = \prod_{i=0}^{K} p_i.$$

Each client generates a secret key $s_i$ through a RLWE sample, and generates a public key $pk_i$ and a multiplication key $mk_i$ by using the secret key $s_i$.

$$pk_i = (\alpha, b_i = -\alpha \cdot s_i + x_i), mk_i = (mk_{i,0}, mk_{i,1}, mk_{i,2})$$

Each element of the multiplication key $mk_i$ is as follows. $mk_{i,0}$ is selected from the uniform distribution defined on $R_Q * R_P$.

$$mk_{i,1} = -s_i \cdot mk_{i,0} + e_{i,1} + P \cdot r_i$$

$$mk_{i,2} = -r_i \cdot \alpha + e_{i,2} + P \cdot s_i$$

$e_{i,1}$ and $e_{i,2}$ denote an error distribution on $R_Q$, $r_i \leftarrow X$, and $r_i$ is selected from a key distribution. For example, $r_i$ is selected from the secret key distribution, and n is removed during a multiplication operation to function as a temporary secret key used to perform the multiplication operation.

When prior communication between the clients 110, 112, and 114 is impossible, as illustrated in the example illustrated in FIG. 1, the public key $pk_i = (\alpha, b_i = -as_i + x_i)$ and the multiplication key $mk_i = (mk_{i,0}, mk_{i,1}, mk_{i,2})$ that the server 120 has to possess becomes massive. In addition, when a client uses an electronic device having, for example, a memory with limited resources, such as a mobile phone, generating a key for homomorphic operation may be burdensome.

In order to solve this problem, in an embodiment, a public key protection error used when generating a RLWE sample may be reused to reduce the size of the multiplication key and reduce the operation time. This will be described with reference to FIG. 2.

Figure 2:
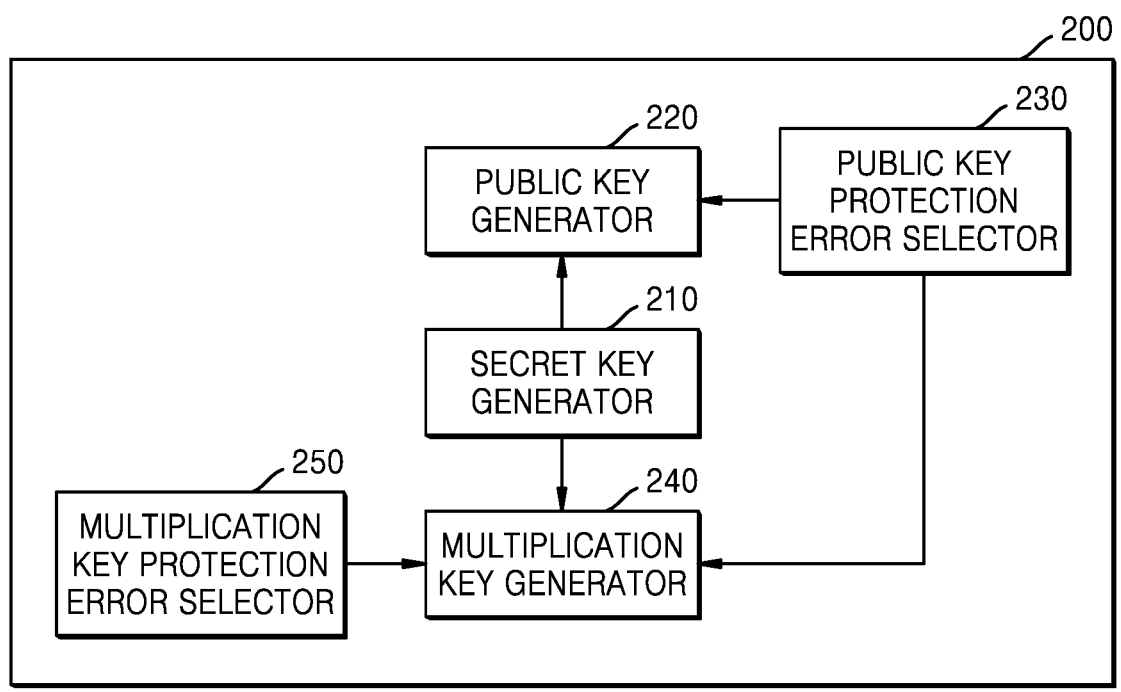
FIG. 2 illustrates an internal configuration of a device for performing multi-key homomorphic encryption, according to an embodiment.

FIG. 2 illustrates an internal configuration of a device 200 for performing multi-key homomorphic encryption, according to an embodiment.

The device 200 for performing multi-key homomorphic encryption is implemented in a Re-RLWE environment. The Re-RLWE environment refers to a modified environment in which an error used when generating a RLWE sample is reused. A format of a Re-RLWE sample is defined as follows.

$$(\alpha_i, -\alpha s + x, \alpha x + e), \alpha \leftarrow R_Q, s \leftarrow \chi^{key}, x, e \leftarrow \chi_{err}$$

, where a is an element selected from a uniform distribution on $R_Q$, s is a secret key distribution, and x and e denote an error distribution on $R_Q$, and x represents a public key protection error, and e represents a multiplication key protection error. The public key protection error and the multiplication key protection error are selected from an arbitrary key distribution, and an example of the arbitrary key distribution includes a Discrete Gaussian Distribution.

The device 200 for performing multi-key homomorphic encryption includes a secret key generator 210, a public key generator 220, a public key protection error selector 230, a multiplication key generator 240, and a multiplication key protection error selector 250.

The secret key generator 210 generates a secret key $s_i$ through the Re-RLWE sample. Unlike the RLWE sample, by adding ax+e to the Re-RLWE sample, the size of a multiplication key may be reduced.

For example, when communication between clients is difficult, in order to perform multiplication of RLWE multi-key homomorphic encryption, a public key $pk_i=(\alpha, b_i=-\alpha \cdot s_i+x_i)$ and a multiplication key $mk_i=(a',b',c')=')=(mk_0, mk_1, mk_2)$ were required. However, according to an embodiment, in order to perform multiplication of RLWE multi-key homomorphic encryption when communication between clients is difficult, the public key $pk_i=(\alpha, b_i=-\alpha \cdot s_i+x_i)$ and the multiplication key $mk_i=c=ax+e$ are required. That is, in the related art, there are multiplication keys$(mk_0,mk_1,mk_2)$, requiring three elements, but in the disclosure, the multiplication key is reduced to one element, $mk_i$, and thus, the size of the multiplication key is reduced.

The public key generator 220 generates a public key $pk_i=(\alpha, b_i=-\alpha \cdot s_i+x_i)$ by using the secret key $s_i$ and a public key protection error $x_i$ selected by the public key protection error selector 230.

The multiplication key generator 240 generates a multiplication key $mk_i=\alpha \cdot x_i+e_i+P \cdot s_i$ by using the secret key $s_i$, the public key protection error $x_i$, and the multiplication key protection error $e_i$ selected by the multiplication key protection error selector 250. In other words, the public key protection error $x_i$ that is used when generating the public key $pk_i=(\alpha, b_i=-\alpha \cdot s_i+x_i)$ is reused when generating a multiplication key to thereby reduce the size of the multiplication key. The multiplication key protection error selector 250 selects the multiplication key protection error $e_i$ from $e \leftarrow \chi_{err}$. For example, the multiplication key protection error $e_i$ may be selected from a Discrete Gaussian Distribution.

In the multiplication key $mk_i=\alpha \cdot x_i+e_i+P \cdot s_i$, $\alpha \cdot x_i$, and $e_i$ are elements constituting a Re-RLWE sample. $e_i$ denotes a multiplication key protection error, and it is not easy to find the public key protection error $x_i$ through $e_i$, making the entire distribution appear as a uniform distribution. P is a variable to prevent an error value from rapidly increasing when multiplication is performed in a homomorphic encryption operation.

The multiplication key generator 240 generates a common multiplication key that $$\widehat{mk} = \sum_{i=0}^{k-1} mk_i$$

for all multiplication keys when prior communication is possible between clients. k denotes the number of clients.

Figure 3:
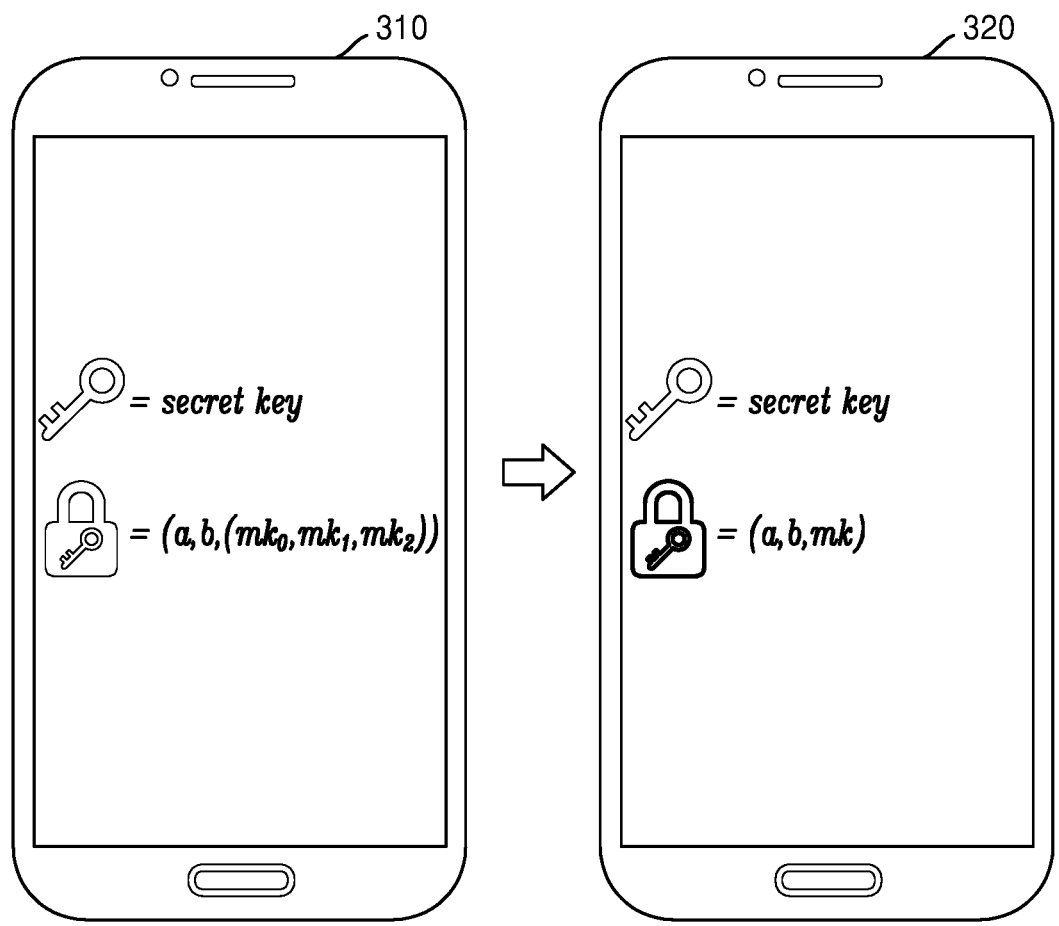
FIG. 3 illustrates an example of generating a multiplication key through multi-key homomorphic encryption when prior communication between clients is impossible, according to an embodiment.

FIG. 3 illustrates a multiplication key in each of a RLWE environment and a Re-RLWE environment when prior communication between clients is impossible, according to an embodiment.

In the related art, when prior communication between clients is impossible, a client 310 generates a secret key, public keys a and b, and multiplication keys$(mk_0,mk_1,mk_2)$. In an embodiment, a client 320 generates a secret key, public keys a and b, and a modified multiplication key $mk_i$, and accordingly, the multiplication keys of the related art $(mk_0, mk_1,mk_2)$ are changed to $mk_i$, and the size of the multiplication keys is reduced to ⅓.

Even when prior communication between clients is possible, according to the related art, a clients generates a secret key, public keys a and b, and multiplication keys $(\hat{mk}_0, \hat{mk}_1)$. In an embodiment, a client generates a secret key, public keys a and b, and a multiplication key $mk_i$, and accordingly, the multiplication keys of the related art $(\hat{mk}_0,\hat{mk}_1)$ are changed to $mk_i$, and the size of the multiplication keys is reduced by ½.

The device described above may be implemented as hardware components, software components, and/or a combination of hardware components and software components. For example, devices and components described in the embodiments may be realized by using at least one or more general-use computers or special-purpose computers, such as a processor, a controller, an arithmetic logic unit (ALU), a digital signal processor, a microcomputer, a field programmable gate array (FPGA), a programmable logic unit (PLU), microprocessor, or any other device that may execute and respond to an instruction. A processing apparatus may execute an operating system (OS) and one or more software applications running on the OS. In addition, the processing apparatus may access, store, manipulate, process, and generate data in response to execution of software. For ease of understanding, it may be described that a single processing apparatus is used, but one of ordinary skill in the art will be aware that the processing apparatus may include a plurality of processing elements and/or a plurality of types of processing elements. For example, the processing apparatus may include a plurality of processors or a single processor, and a controller. The processing apparatus may have another processing configuration, such as a parallel processor.

A method according to an embodiment may be embodied as program commands executable by various computer means and may be recorded on a computer-readable recording medium. The computer-readable recording medium may include program commands, data files, data structures, and the like separately or in combinations. The program commands recorded on the computer-readable recording medium may be specially designed and configured for the embodiments or may be well-known to and be usable by one of ordinary skill in the art of computer software. Examples of the computer-readable recording medium include a magnetic medium such as a hard disk, a floppy disk, or a magnetic tape, an optical medium such as a CD-ROM or a DVD, a magneto-optical medium such as a floptical disk, and a hardware device specially configured to store and execute program commands such as a ROM, a RAM, or a flash memory. Examples of the program commands include high-level language codes that may be executed by a computer by using an interpreter or the like as well as machine language codes made by a compiler.

According to the method of generating a multiplication key by reusing an error in multi-key homomorphic encryption, as an embodiment, the size of the multiplication key may be reduced, thereby reducing the usage amount of memory by a client and a server.

In addition, in multi-key homomorphic encryption without using inter-client communication, ModUp and Mod-Down operations are required twice each to perform one homomorphic multiplication in an existing method. However, according to the multi-key homomorphic encryption method according to an embodiment, the size of a multiplication key may be reduced, and also a ModUp operation and a ModDown operation are required only once, thereby reducing the entire multiplication operation time.

While the disclosure has been particularly shown and described with reference to examples thereof, it will be understood by those of ordinary skill in the art that various changes in form and details may be made therein without departing from the spirit and scope of the disclosure as defined by the following claims. For example, an appropriate result may be attained even when the above-described techniques are performed in a different order from the above-described method, and/or components, such as the above-described system, structure, device, and circuit, are coupled or combined in a different form from the above-described methods or substituted for or replaced by other components or equivalents thereof. Therefore, other implementations, other embodiments, and equivalents of the claims fall within the scope of the claims.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A device for performing multi-key homomorphic encryption, the device comprising:
    memory storing one or more instructions; and
    one or more processors;
    wherein the one or more instructions, when executed by the one or more processors, cause the device to:
        generate a public key based on a secret key for each of a plurality of clients;
        generate corresponding multiplication keys for the plurality of clients by reusing public key protection errors used in the generating of the public key, wherein a multiplication key is generated using a modified Ring Learning with Error (RLWE) sample, and wherein the modified RLWE sample is defined in the form of $(\alpha, -\alpha s+x, \alpha x+e)$, where a denotes an element selected from a uniform distribution on Rq, s denotes a secret key distribution, and x and e denote an error distribution;
        receive, from the plurality of clients, ciphertexts encrypted using corresponding public keys;
        perform homomorphic operations on the ciphertexts using the corresponding multiplication keys to obtain resulting ciphertexts; and
        transmit the resulting ciphertexts to the plurality of clients.

2. The device of claim 1, wherein the public key is defined in the form that $pk_i=(\alpha, b_i=-\alpha \cdot s_i+x_i)$, where a denotes the element selected from the uniform distribution on Rq, $s_i$ denotes a secret key, and $x_i$ denotes the public key protection error.

3. The device of claim 1, wherein the public key is that $mk_i=\alpha \cdot x_i+e_i+P \cdot s_i$, where a denotes an element selected from the uniform distribution on $R_q$, $s_i$ denotes a secret key, and $x_i$ denotes the public key protection error, and $e_i$ denotes a multiplication key protection error.

4. The device of claim 3, wherein, when prior communication between the plurality of clients is possible, a common multiplication key that $$mk = \sum_{i=0}^{k-1} mk_i,$$

$mk_i=\alpha \cdot x_i+e_i+P \cdot s_i$ is generated with respect to all multiplication keys.

5. A device for performing multi-key homomorphic encryption, the device comprising:
    memory storing one or more instructions; and
    one or more processors;
    wherein the one or more instructions, when executed by the one or more processors, cause the device to:
        generate a secret key;
        select a public key protection error from an error distribution;
        generate a public key based on the secret key and the public key protection error;
        select a multiplication key protection error from the error distribution;
        generate a multiplication key based on the secret key, the public key protection error, and the multiplication key protection error, wherein the multiplication key is generated by using a modified Ring Learning with Error (RLWE) sample, and wherein the modified RLWE sample is defined in the form of $(\alpha, -\alpha s+x, \alpha x+e)$, where a denotes an element selected from a uniform distribution on Rq, s denotes a secret key distribution, and x and e denote an error distribution;
        receive, from at least one client, a ciphertext encrypted using the public key;
        perform a homomorphic operation on the ciphertext using the multiplication key to obtain a resulting ciphertext; and
        transmit the resulting ciphertext to the at least one client.

6. A method of performing multi-key homomorphic encryption, the method comprising:
    generating a public key based on a secret key for each of a plurality of clients;
    generating corresponding multiplication keys for the plurality of clients by reusing public key protection errors used in the generating of the public keys, wherein a multiplication key is generated using a modified Ring Learning with Error (RLWE) sample, and wherein the modified RLWE sample is defined in the form of $(\alpha, -\alpha s+x, \alpha x+e)$, where a denotes an element selected from a uniform distribution on Rq, s denotes a secret key distribution, and x and e denote an error distribution;
    receiving, from the plurality of clients, ciphertexts encrypted using corresponding public keys;
    performing homomorphic operations on the ciphertexts using the corresponding multiplication keys to obtain resulting ciphertexts; and
    transmitting the resulting ciphertexts to the plurality of clients.

7. The method of claim 6, wherein the public key is defined in the form that $pk_i=(\alpha, b, -\alpha \cdot s_i+x_i)$, and a denotes an element selected from the uniform distribution on Rq, $s_i$ denotes a secret key, and $x_i$ denotes the public key protection error.

8. The method of claim 6, wherein the public key is that $mk_i=\alpha \cdot x_i+e_i+P \cdot s_i$, and a denotes an element selected from the uniform distribution on Rq, $s_i$ denotes a secret key, and $x_i$ denotes the public key protection error, and $e_i$ denotes a multiplication key protection error.

9. The method of claim 8, wherein, when prior communication between the plurality of clients is possible, a common multiplication key that $$\widetilde{mk} = \sum_{i=0}^{k-1} mk_i,$$

$mk_i = \alpha \cdot x_i + e_i + P \cdot s_i$ is generated with respect to all multiplication keys.

10. A non-transitory computer-readable recording medium having one or more instructions recorded thereon, that, when executed by one or more processors, cause the one or more processors to:

generate a public key based on a secret key for each of a plurality of clients;

generate corresponding multiplication keys for the plurality of clients by reusing public key protection errors used in the generating of the public keys, wherein a multiplication key is generated using a modified Ring Learning with Error (RlWE) sample, and wherein the modified RLWE sample is defined in the form of ($\alpha$, $-\alpha s + x\alpha x + e$), where a denotes an element selected from a uniform distribution on Rq, s denotes a secret key distribution, and x and e denote an error distribution;

receive, from the plurality of clients, ciphertexts encrypted using corresponding public keys;

perform homomorphic operations on the ciphertexts using the corresponding multiplication keys to obtain resulting ciphertexts; and transmit the resulting ciphertexts to the plurality of clients.

\* \* \* \* \*